(12) United States Patent
Fujiune

(10) Patent No.: US 10,999,565 B2
(45) Date of Patent: May 4, 2021

(54) PROJECTING DEVICE

(71) Applicant: Panasonic Intellectual Property Management Co., Ltd., Osaka (JP)

(72) Inventor: Kenji Fujiune, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 16/129,349

(22) Filed: Sep. 12, 2018

(65) Prior Publication Data

US 2019/0014295 A1      Jan. 10, 2019

Related U.S. Application Data

(62) Division of application No. 15/337,066, filed on Oct. 28, 2016, now abandoned.

(30) Foreign Application Priority Data

Mar. 10, 2016   (JP) .............................. JP2016-047649

(51) Int. Cl.
*H04N 9/28*       (2006.01)
*H04N 9/31*       (2006.01)

(52) U.S. Cl.
CPC ............. *H04N 9/3185* (2013.01); *H04N 9/28* (2013.01); *H04N 9/3194* (2013.01)

(58) Field of Classification Search
CPC ....................................................... H04N 9/28
USPC ........................................................ 348/745
See application file for complete search history.

(56) References Cited

U.S. PATENT DOCUMENTS

| | | | |
|---|---|---|---|
| 8,773,529 B2 * | 7/2014 | Kießhauer | H04N 9/3194 348/135 |
| 2012/0133837 A1 | 5/2012 | Furukawa | |
| 2014/0104163 A1 * | 4/2014 | Ide | G06F 3/0425 345/156 |
| 2015/0222842 A1 | 8/2015 | Kwong | |
| 2016/0098862 A1 * | 4/2016 | Wilson | H04N 9/3185 345/419 |

FOREIGN PATENT DOCUMENTS

| | | |
|---|---|---|
| JP | 2005-115270 | 4/2005 |
| JP | 2012-118121 | 6/2012 |

\* cited by examiner

*Primary Examiner* — John W Miller
*Assistant Examiner* — Sihar A Karwan
(74) *Attorney, Agent, or Firm* — Wenderoth, Lind & Ponack, L.L.P.

(57) ABSTRACT

A projecting device includes a projector configured to project a projection image including a content image onto a projection surface; detectors configured to detect a target position at which the content image is to be projected; an image processor configured to generate the projection image; a driver configured to change an orientation of the projector in order to change a projection position of the projection image; and a controller configured to control the image processor to set a position of the content image included in the projection image in order to minimize a difference between a display position of the content image and the target position when an optical axis of the projector is orthogonal to the projection surface, and control the driver to set the orientation of the projector in order to project the projection image at the target position on the projection surface.

16 Claims, 14 Drawing Sheets

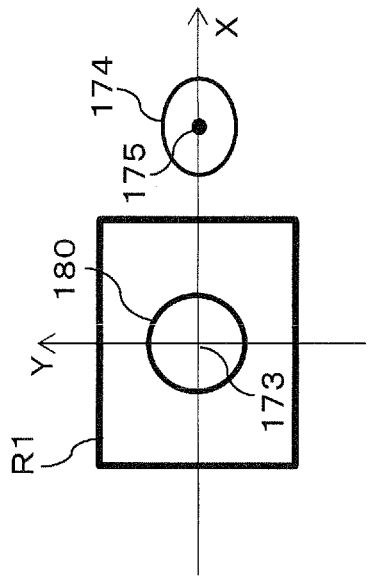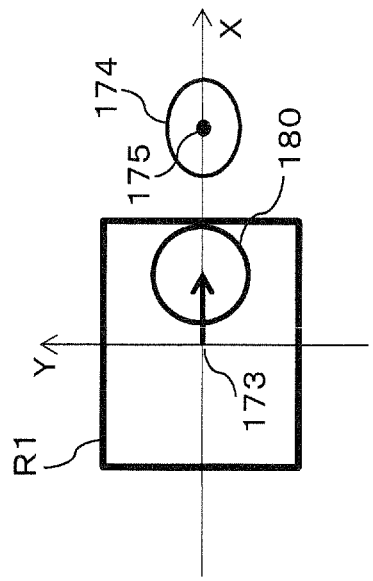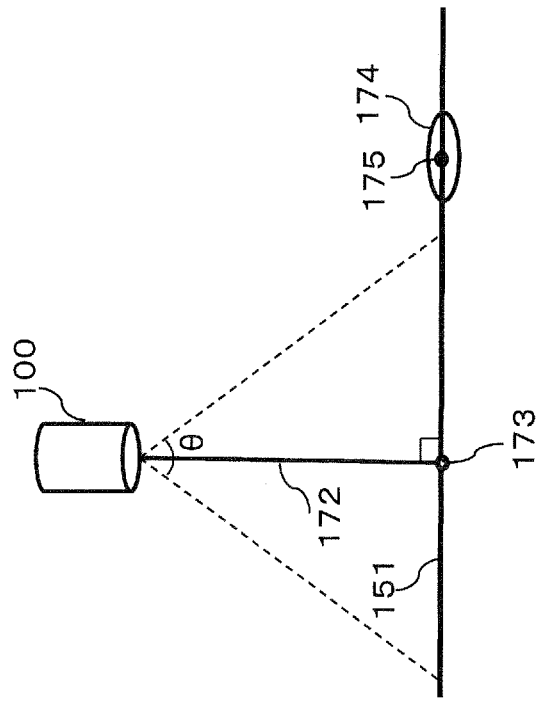

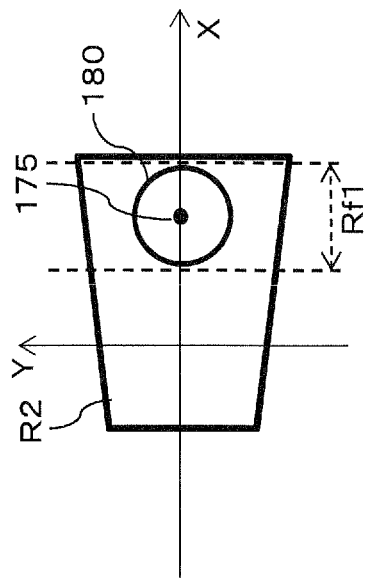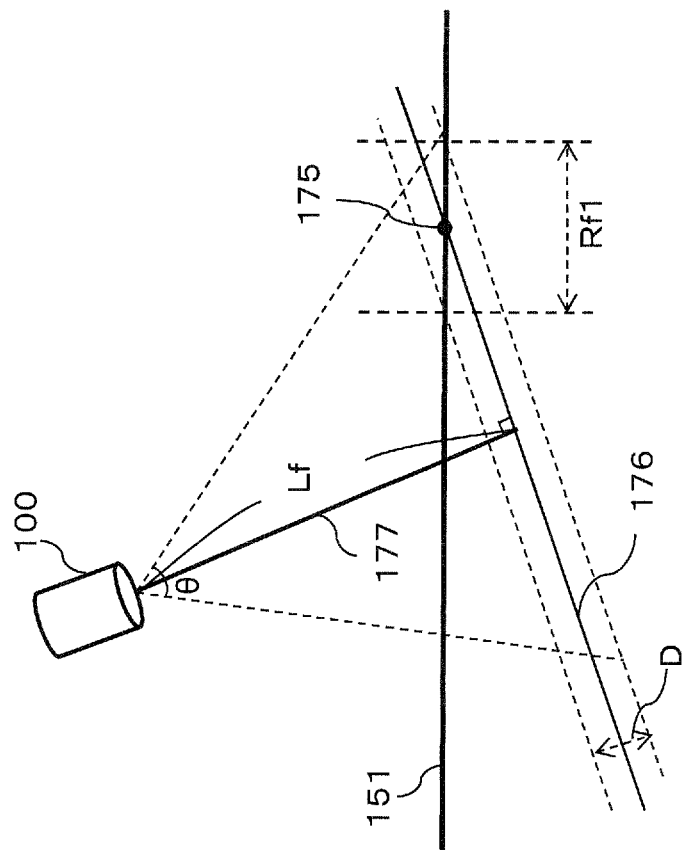

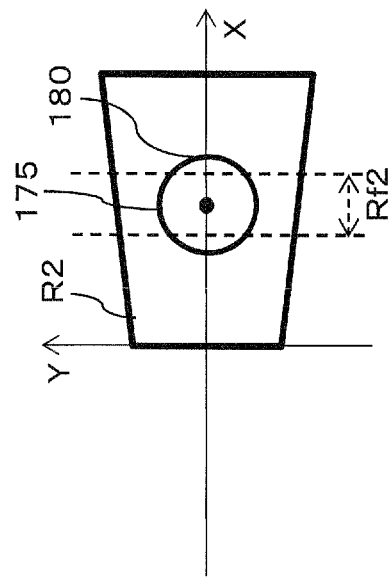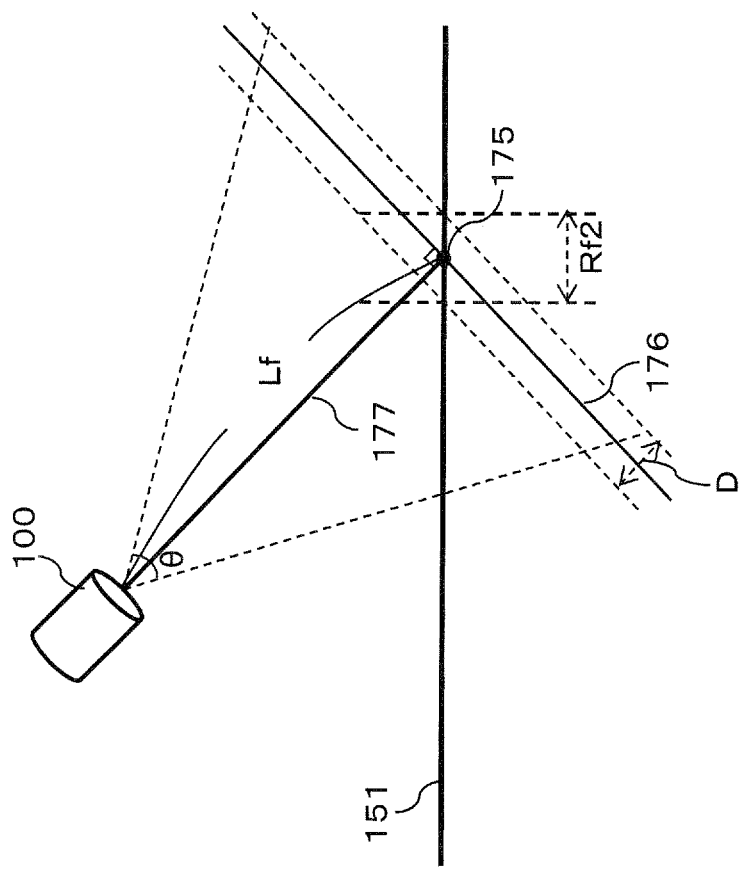

PROJECTING DEVICE

BACKGROUND

1. Technical Field

The present disclosure relates to a projecting device which detects a predetermined target and projects a video while following the detected target.

2. Related Art

In recent years, as a method of sending information about advertisements, guides and the like to a moving person, an advertising method (i.e., a digital signage) using a display device such as a liquid crystal display device or a projector becomes popular. Furthermore, there is also studied and developed a liquid crystal display device for detecting a moving person and individually displaying information to the detected person (for example, see JP 2005-115270 A and JP 2012-118121 A).

JP 2005-115270 A discloses a display device for moving body additional information including a video camera for imaging a moving body passing through a wall surface or a floor surface having an inside of a certain frame as a background, an image processor for sequentially extracting positional coordinates of the moving body entering an inner part of a current image picked up sequentially by means of the video camera, calculating, based on the extracted positional coordinates, respective positional coordinates for display which are placed apart from the positional coordinates, sequentially inserting information of texts, images and the like in a predetermined display size into the respective calculated positional coordinates for display, and outputting the information as video information, and a video display device having a display screen on a wall surface or a floor surface and serving to display video information such as texts, images and the like in the predetermined display sizes on the display screen in accordance with the movement of the moving body. According to the display device, it is possible to recognize a moving body (e.g., a person) by means of the video camera and to individually display information for the recognized moving body.

As a video display device of this type, a display or a projector is used. In the case in which a wide range is covered with a single video display device, the projector is used to project a video onto a projection surface while changing a projecting direction. In this case, a focused range is reduced on the projection surface depending on a projecting direction of the image projected from the projecting device. Consequently, only a part of the projection image (a projection region) is focused in some cases.

SUMMARY

The present disclosure provides a projecting device capable of enlarging a focus scope where a focused projection image is obtained when a video is to be projected onto a projection surface.

According to one aspect of the present disclosure, a projecting device is provided. The projecting device includes a projector configured to project a projection image including a content image onto a projection surface, a first detector configured to detect a target position on the projection surface at which the content image is to be projected, an image processor configured to generate the projection image, a driver configured to change an orientation of the projector in order to change the projection position of the projection image, and a controller configured to control the image processor and the driver. The controller controls the image processor to set the position of the content image included in the projection image in order to minimize a difference between a display position and a target position on the projection surface of the content image when the projection image is projected in a state in which the orientation of the projector is set such that the optical axis of the projector is orthogonal to the projection surface, and controls the driver to set the orientation of the projector in order to project, at the target position on the projection surface, the projection image including the content image at the set position.

According to the present disclosure, in the case in which a video is projected onto the projection surface, it is possible to enlarge a focus scope where a focused projection image is obtained.

BRIEF DESCRIPTION OF DRAWINGS

FIGS. 6A, 6B and 6C are views for explaining control of a position of a content image in a projection image through the controller of the projector device (in the case in which a target projection position is placed out of a range of the projection image in a state in which an optical axis of the projector device is orthogonal to a projection surface).

FIGS. 9A and 9B are views showing a focus scope on the projection surface through projection control of a projector device 100 according to the present embodiment.

FIGS. 10A and 10B are views showing a focus scope on the projection surface through the projection control of the projector device 100 according to a comparative example.

DETAILED DESCRIPTION OF PREFERRED EMBODIMENT

Embodiments will be described below in detail with reference to the drawings. In some cases, however, unnecessary detailed description will be omitted. For example, detailed description of well-known matters or repetitive description of substantially identical structures will be omitted in some cases. The reason is that unnecessary redundancy of the following description is to be avoided and a person skilled in the art is to be enabled to make easy understanding.

The inventor(s) provide(s) the accompanying drawings and the following description for allowing a person skilled in the art to fully understand the present disclosure and it is not intended that the subject described in claims should be thereby restricted to the accompanying drawings and the following description.

First Embodiment

A first embodiment will be described with reference to the accompanying drawings. In the following, description will be given of a projector device as a specific embodiment of a projecting device according to the present disclosure.

[1-1. Outline]

Figure 1:
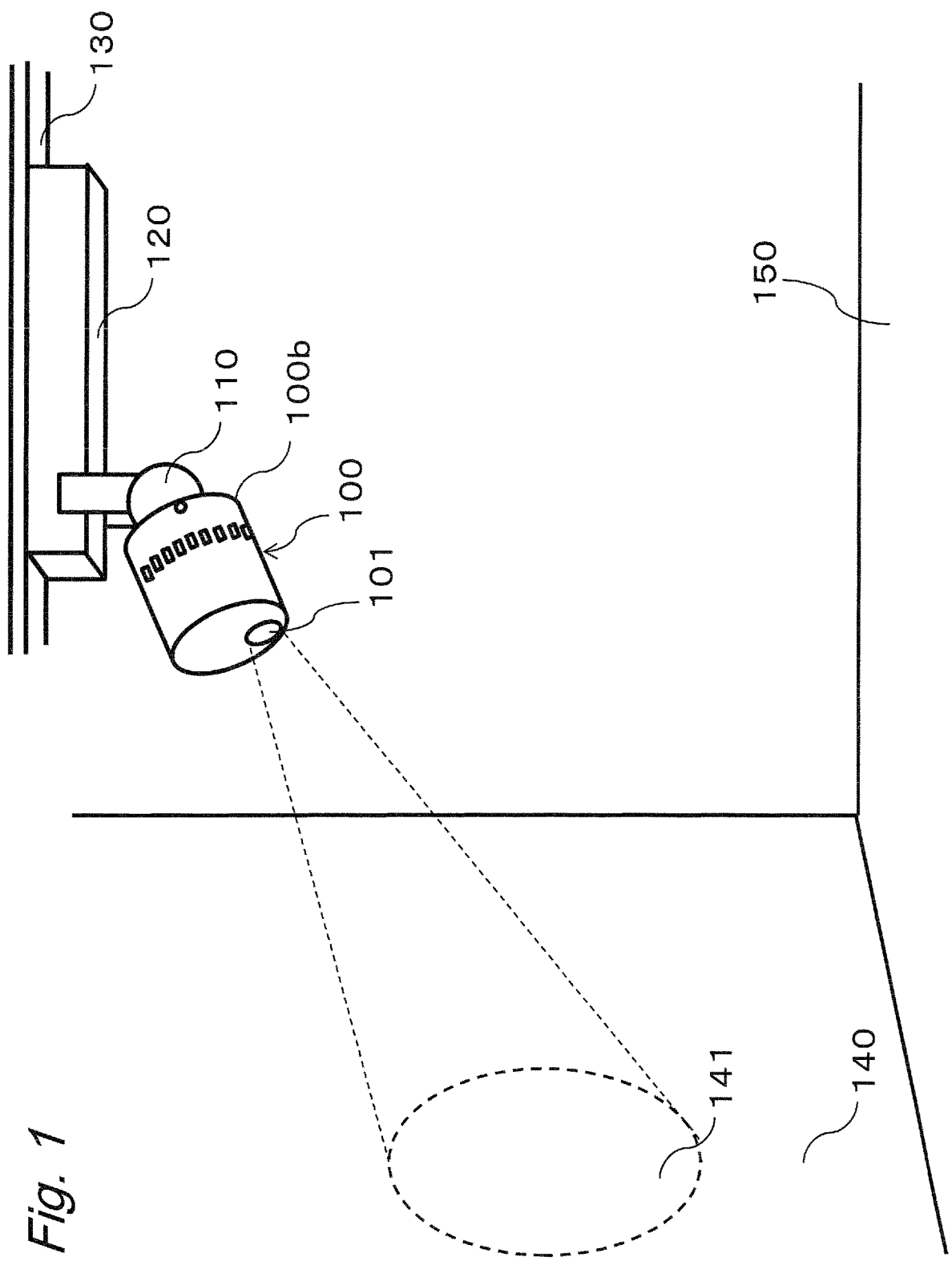
FIG. 1 is a schematic diagram showing a situation in which a projector device projects a video onto a wall surface.
Figure 2:
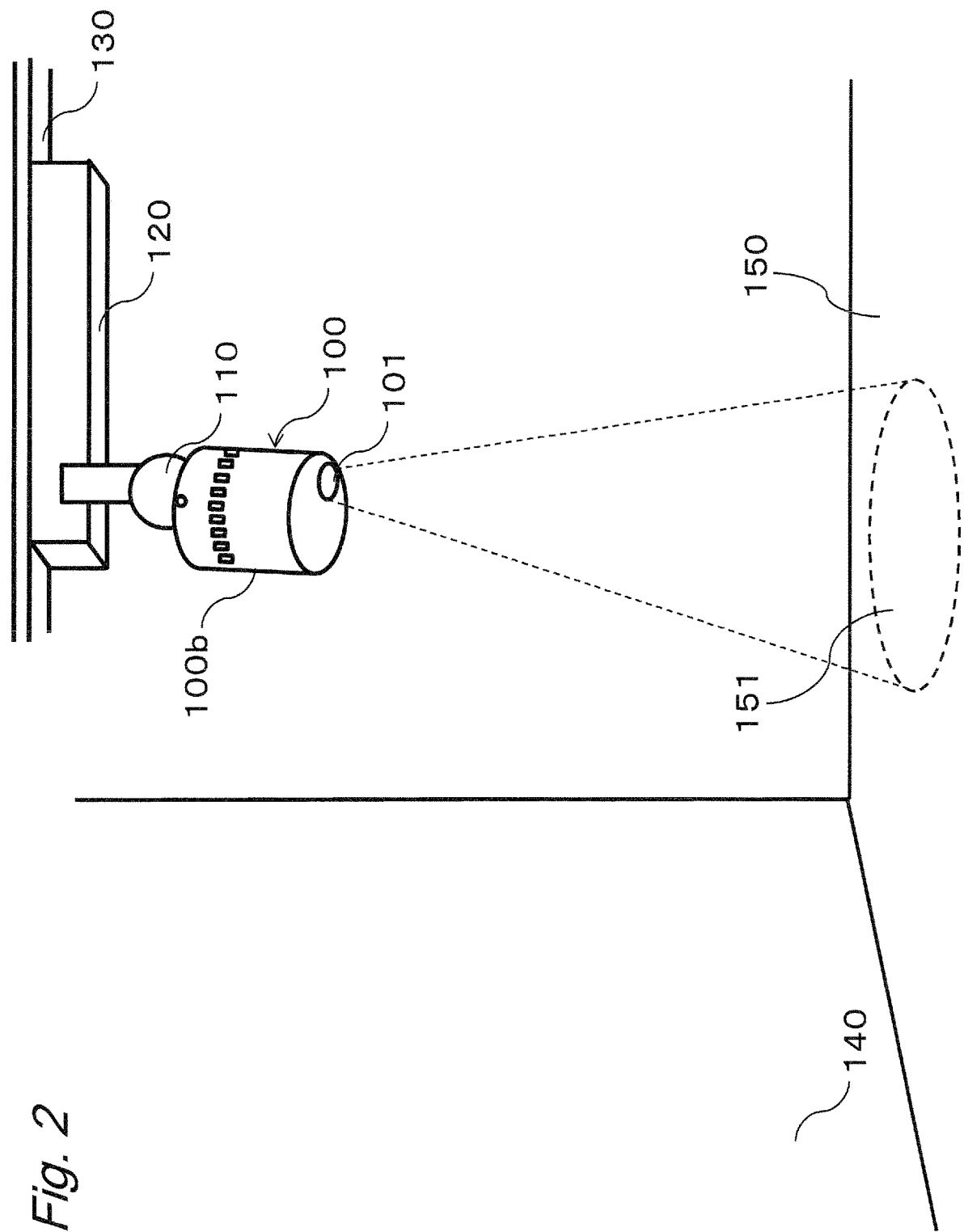
FIG. 2 is a schematic diagram showing a situation in which the projector device projects a video onto a floor surface.

With reference to FIGS. 1 and 2, the outline of a projecting operation to be performed by the projector device 100 will be described. FIG. 1 is an image view of the projector device 100 projecting a video onto a wall 140. FIG. 2 is an image view of the projector device 100 projecting a video onto a floor surface 150.

As shown in FIGS. 1 and 2, the projector device 100 is fixed to a housing 120 together with a driver 110. A wiring connected electrically to each component of a body 100b of the projector device and the driver 110 is connected to a power supply through the housing 120 and a wiring duct 130. Consequently, power is supplied to the body 100b of the projector device 100 and the driver 110. The projector device 100 has an opening 101 formed in the body 100b. The projector device 100 projects a video through the opening 101.

The driver 110 can drive the projector device 100 to change a projecting direction of the projector device 100 (in other words, to change an orientation, that is, a posture of the body 100b of the projector device). The driver 110 can drive the projector device 100 to set the projecting direction of the projector device 100 to a direction of the wall 140 as shown in FIG. 1. Thus, the projector device 100 can project a video 141 onto the wall 140. Similarly, the driver 110 can drive the projector device 100 to change the projecting direction of the projector device 100 to a direction of the floor surface 150 as shown in FIG. 2. Thus, the projector device 100 can project a video 151 onto the floor surface 150. The driver 110 may drive the projector device 100 based on a manual operation of a user or may automatically drive the projector device 100 depending on a result of detection obtained by a predetermined sensor. Moreover, the video 141 to be projected onto the wall 140 and the video 151 to be projected onto the floor surface 150 may be different in contents from each other or may be identical in contents to each other. The driver 110 includes an electric motor. The driver 110 turns the body 100b of the projector device 100 in a horizontal direction (a pan direction) and a vertical direction (a tilt direction) to change the orientation (posture) of the projector device 100. Thus, the driver 110 can change the projecting direction of the video, that is, a projection position of the video.

The projector device 100 can detect a specific object and project a video (a content) at a position or in a region having a predetermined positional relationship with a position of the specific object set to be a reference while following the movement of the detected object. In the following description, the projector device 100 detects a "person" as the specific object and projects a video while following the movement of the detected person.

[1-2. Structure]

The structure and operation of the projector device 100 will be described below in detail.

Figure 3:
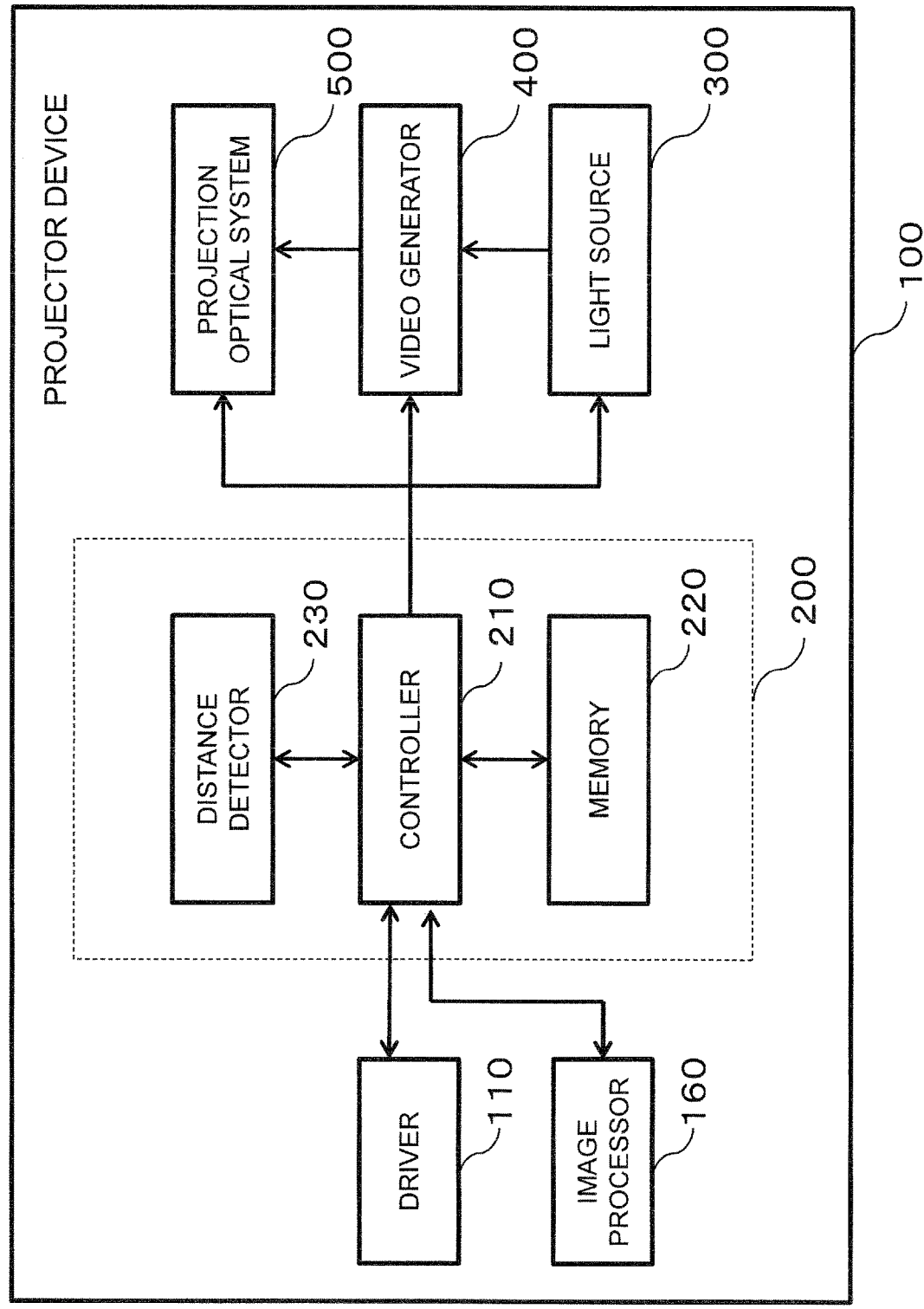
FIG. 3 is a block diagram showing an electrical structure of the projector device.

FIG. 3 is a block diagram showing the electrical structure of the projector device 100. The projector device 100 includes a driving controller 200, a light source 300, a video generator 400, and a projection optical system 500. Moreover, the projector device 100 includes the driver 110 and an image processor 160. The structure of each component of the projector device 100 will be described below in order.

The driving controller 200 includes a controller 210, a memory 220, and a distance detector 230.

The controller 210 is a semiconductor device which controls the whole projector device 100. In other words, the controller 210 controls the operations of the respective components (the distance detector 230, the memory 220) of the driving controller 200, the light source 300, the video generator 400, and the projection optical system 500. Moreover, the controller 210 controls the image processor 160 in order to change a display position of a content image within a projection angle of view of the projection light from the projector device 100 (i.e., a position of the content image in a projection image on the projection surface). The controller 210 also controls the driver 110 in order to change a projecting direction of the projection light from the projector device 100 (i.e., a projection position of the projection image). Moreover, the controller 210 performs focus control of the projection image. The controller 210 may be configured with only hardware or may be implemented by combining hardware with software. For example, the controller 210 can be configured with at least one CPU, MPU, GPU, ASIC, FPGA, DSP or the like.

The memory 220 is a storage element which stores various kinds of information. The memory 220 is configured with a flash memory, a ferroelectric memory, or the like. The memory 220 stores, for example, a control program for controlling the projector device 100. Moreover, the memory 220 stores various kinds of information supplied from the controller 210. Furthermore, the memory 220 stores data (a still image, a moving image) on a content image to be projected, a reference table including setting of a display size of the content image, position information and a projection angle of view of the projector device 100, distance information from the projector device 100 to the projection surface, and the like, data on a shape of a target object for object detection, and the like.

The distance detector 230 is configured with a distance image sensor of, for example, a TOF (Time-of-Flight) type (hereinafter, such a sensor will be referred to as a TOF sensor) and linearly detects a distance from the distance detector 230 to an opposed projection surface or object. When the distance detector 230 is opposed to the wall 140, the distance detector 230 detects a distance from the distance detector 230 to the wall 140. If a picture is suspended and hung on the wall 140, the distance detector 230 can also detect a distance from the distance detector 230 to an opposed surface of the picture. When the distance detector 230 is opposed to the floor surface 150, similarly, the distance detector 230 detects a distance from the distance detector 230 to the floor surface 150. If an object is mounted on the floor surface 150, the distance detector 230 can also detect a distance from the distance detector 230 to an opposed surface of the object. The distance detector 230 may be a sensor using infrared rays or a sensor using visible light.

The controller 210 can detect a projection surface (e.g., the wall 140, the floor surface 150) or a specific object (e.g., a person, an article) based on distance information supplied from the distance detector 230.

Although the TOF sensor has been described above as an example of the distance detector 230, the present disclosure is not restricted thereto. In other words, a known pattern such as a random dot pattern may be projected to calculate a distance from a displacement of the pattern, or a parallax generated by a stereo camera may be utilized. Moreover, the projector device 100 may include an RGB camera (not shown) together with the distance detector 230 (TOF). In that case, the projector device 100 may detect the object by using image information to be output from the RGB camera together with the distance information to be output from the TOF sensor. By using the RGB camera together, it is possible to detect the object by utilizing information such as a color possessed by the object or a character described on the object in addition to information about a three-dimensional shape of the object obtained from the distance information.

The image processor 160 is an image processing circuit configured with, for example, an ASIC. The image processor 160 may be configured with a single circuit together with the controller 210. The image processor 160 generates a projection image including a content image from the memory 220. The image processor 160 changes a display position of the content image at the projection angle of view of the projector device 100 (i.e., a position of the content image included in the projection image on the projection surface) by the control of the controller 210. Moreover, the image processor 160 performs geometric correction for the projection image based on the projection position of the projection image.

Subsequently, an optical structure of the projector device 100 will be described. More specifically, description will be given of the structures of the light source 300, the video generator 400, and the projection optical system 500 in the projector device 100.

The light source 300 supplies light necessary for generating a projection video to the video generator 400. For example, the light source 300 may be configured with a semiconductor laser, a dichroic mirror, a λ/4 plate, a phosphor wheel, or the like.

The video generator 400 generates a projection video obtained by spatially modulating light incident from the light source 300 in response to a video signal indicative of a projection image to be generated by the image processor 160 and supplied through the controller 210, and supplies the projection video to the projection optical system 500. For example, it is sufficient that the video generator 400 is configured with a DMD (Digital-Mirror-Device) or the like. In place of a DLP (Digital-Light-Processing) method using the DMD, it is also possible to employ a liquid crystal method.

The projection optical system 500 performs optical conversion such as focusing or zooming on the video supplied from the video generator 400. The projection optical system 500 is opposed to the opening 101 and a video is projected through the opening 101. The projection optical system 500 includes optical members such as a zoom lens and a focus lens. The projection optical system 500 enlarges light advancing from the video generator 400 and projects the enlarged light onto the projection surface. The controller 210 can control the projection region with respect to the projecting target to have a desirable zoom value by adjusting the position of the zoom lens. Moreover, the controller 210 can focus on a projection video by adjusting the position of the focus lens.

[1-3. Operation]

The operation of the projector device 100 having the above structure will be described below. The projector device 100 according to the present embodiment can detect a person as a specific object, follow the movement of the detected person, and project a predetermined video at a position having a predetermined positional relationship with a position of the person (for example, a position placed 1 m before the position of the detected person in the advancing direction).

Specifically, the distance detector 230 emits infrared detection light toward a certain region (e.g., an entrance of a store or a building) and acquires distance information in the region. The controller 210 detects a person, a position of the person, an advancing direction, and the like, based on the distance information acquired by the distance detector 230 (the advancing direction is detected from distance information in a plurality of frames). The controller 210 determines a target projection position at which a projection image is to be projected (e.g., a position placed 1 m before the position of the detected person in the advancing direction) based on the position, the advancing direction, or the like of the detected person. Then, the controller 210 controls the image processor 160 to determine a position of a content image in the projection image so as to project the content image at the target projection position. Further, the controller 210 controls the driver 110 to move the body of the projector device 100 in the pan direction or the tilt direction if necessary. The controller 210 detects the position of the person every predetermined period (e.g., $1/60$ seconds) and projects a video to cause the projection image to follow the person, based on the position of the detected person.

Figure 4:
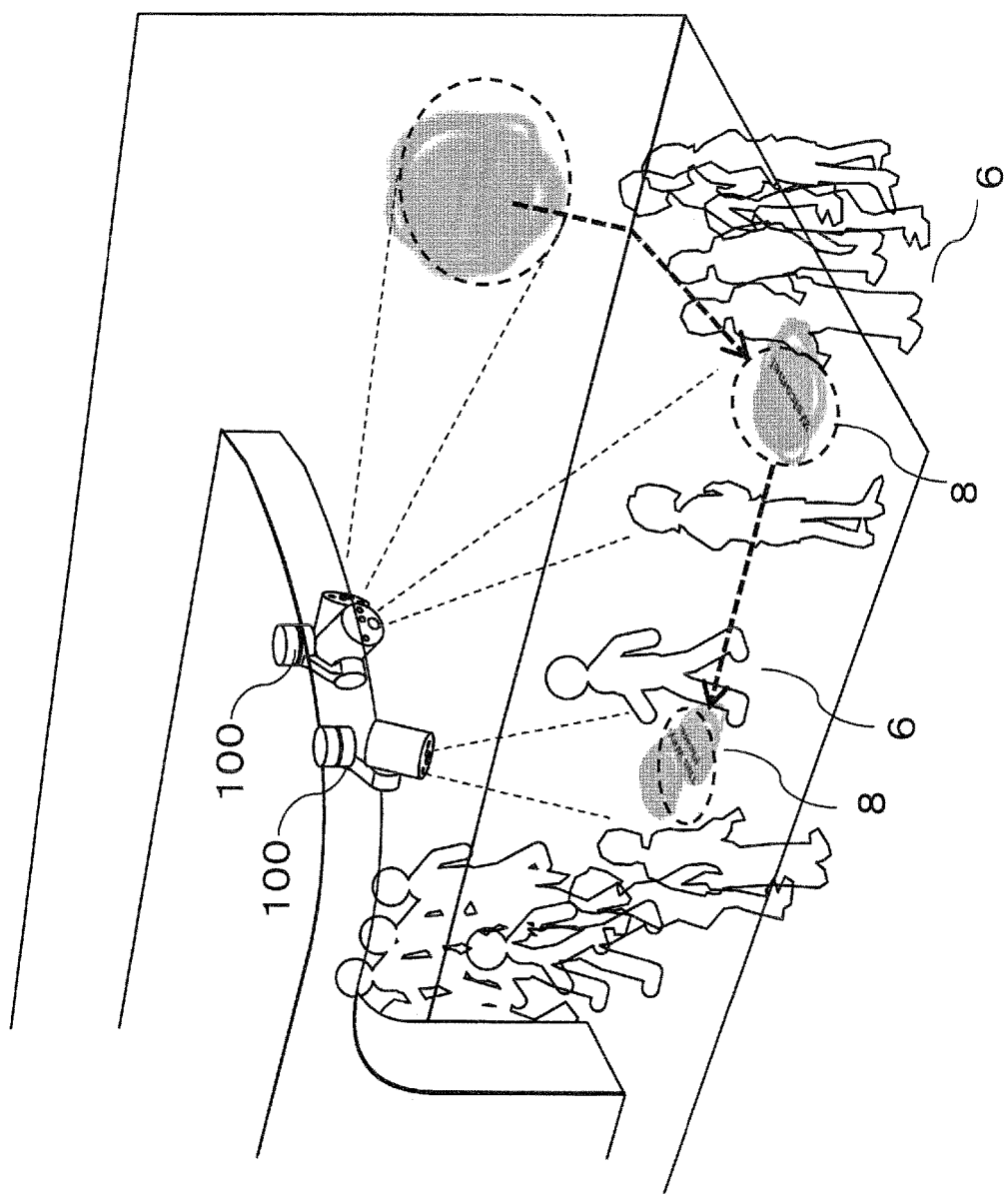
FIG. 4 is an explanatory view showing an example of utilization of the projector device.

For example, as shown in FIG. 4, the projector device 100 is provided on a passageway in a building, a ceiling or a wall of a hall, or the like, and follows the movement of a person 6 to project a projection image 8 when detecting the person 6. The projection image (content image) 8 includes a graphic (an arrow or the like) or a message for leading or guiding the person 6 to a predetermined place or store, a message for welcoming the person 6, an advertising text, an image for directing the movement of the person 6 such as a red carpet, and the like. The projection image 8 may be a still image or a moving image. Consequently, desirable information can be presented to a position where the detected person 6 can always see the desirable information easily depending on the movement of the detected person 6. Thus, the desirable information can be passed to the person 6 reliably.

Figure 5:
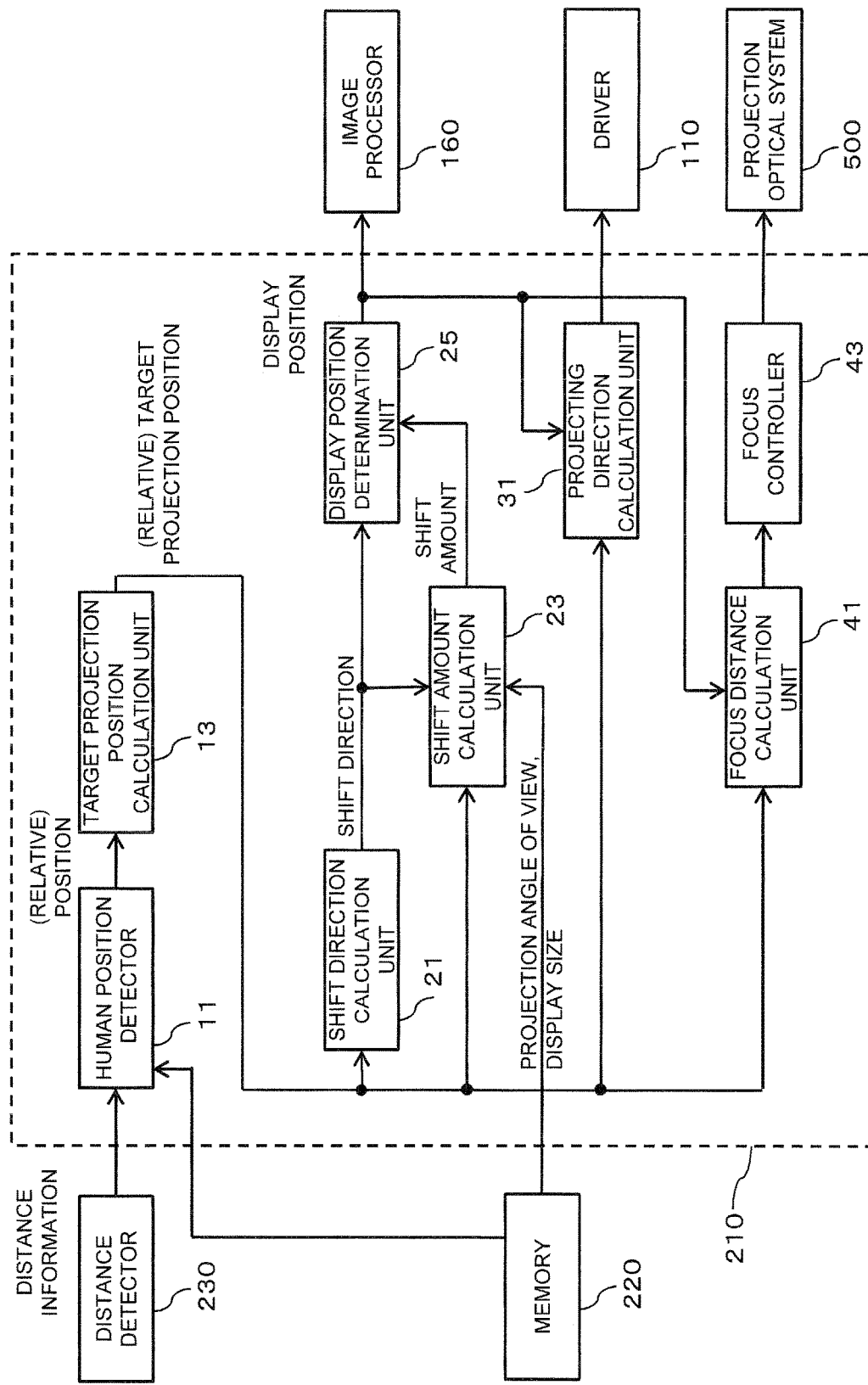
FIG. 5 is a block diagram showing a functional structure of a controller of the projector device (a first embodiment).

The operation of the projector device 100 will be described below in detail. FIG. 5 is a diagram showing a functional structure of the controller 210. In the following description, a position is a two-dimensional vector having a size and a direction.

The human position detector 11 detects a person based on distance information (a distance image) sent from the distance detector 230. The person is detected by previously storing a feature value indicative of the person in the memory 220 and detecting an object indicative of the feature value from the distance information (a distance image). The human position detector 11 further calculates a position (a relative position) of the detected person. Herein, the "relative position" represents a position in a coordinate system with the position of the driver 110 set to be a center. A target projection position calculation unit 13 calculates a target projection position (a relative position) of the projection image on the basis of the position of the detected person. For example, a position placed apart from the position of the detected person by a predetermined distance (e.g., 1 m) in the advancing direction is calculated as the target projection position.

In order to project the content image at the target projection position, a shift direction calculation unit 21, a shift amount calculation unit 23, and a display position determination unit 25 adjust the position of the content image included in the projection image and a projecting direction calculation unit 31 adjusts an adjustment shortage by a change in the projecting direction of the projector device 100 (i.e., the projection position of the projection image).

FIGS. 6A to 6C are views for explaining the control of the position of the content image included in the projection image. FIG. 6A is a view showing the projector device 100 and the projection surface 151 seen laterally, and FIGS. 6B and 6C are views showing the projection surface 151 seen from the projector device 100 side. As shown in FIG. 6A, the projector device 100 is set to such an orientation that an optical axis 172 thereof is basically orthogonal to the projection surface 151. As shown in FIG. 6B, moreover, a projection image R1 to be projected by the projector device 100 includes a content image 180, and the content image 180 is set to be basically positioned on a center of the projection image R1 (at a position where an intersection point 173 of the optical axis 172 and the projection surface 151 is set to be a center).

The projector device 100 shifts the position of the content image 180 included in the projection image R1 and the projecting direction of the projector device 100 depending on a target projection position 175 (a target projection region 174) from the basic state. In other words, as shown in FIGS. 6A and 6B, the shift direction calculation unit 21, the shift amount calculation unit 23, and the display position determination unit 25 control the image processor 160 to shift the position of the content image included in the projection image R1 (at a projection angle of view θ) when the projection position of the content image 180 to be projected in a state in which the optical axis 172 of the projector device 100 is orthogonal to the projection surface 151 is not coincident with the target projection position 175 (e.g., the central position of the target projection region 174). When the position of the content image 180 is not coincident with the target projection position 175, then, the projecting direction calculation unit 31 controls the driver 110 to change the projecting direction of the projector device 100, thereby causing the position of the content image 180 to be coincident with the target projection position 175.

More specifically, the shift direction calculation unit 21 calculates the shift direction in the position of the content image included in the projection image R1. As shown in FIG. 6A, specifically, the shift direction calculation unit 21 obtains the intersection point (i.e., the relative position) 173 of the optical axis 172 and the projection surface 151 in a state in which the orientation of the projector device 100 is set such that the optical axis 172 of the projector device 100 is orthogonal to the projection surface 151. As shown in FIG. 6C, then, the shift direction calculation unit 21 obtains a direction from the position of the intersection point 173 toward the target projection position 175 (e.g., the central position of the target projection region 174) on the projection surface 151 (e.g., a direction shown with an arrow in FIG. 6C) as a shift direction of the position of the content image 180 included in the projection image R1.

The shift amount calculation unit 23 calculates a shift amount of the content image included in the projection image R1. Specifically, the shift amount calculation unit 23 obtains a range of the projection image R1 in the projection surface 151 based on information about the projection angle of view θ and a distance from the projector device 100 to the projection surface 151, the information being stored in the memory 220. Then, the shift amount calculation unit 23 obtains a shift amount (e.g., the distance from the position 173 to the central portion of the content image 180) such that the content image 180 is positioned in a most end of the projection image R1 in the shift direction, in consideration of information about the display size of the content image stored in the memory 220 (e.g., a value in an X direction and a value in a Y direction of a rectangular shape) (see FIG. 6C).

The display position determination unit 25 determines the position of the content image included in the projection image R1 (e.g., the central position of the content image) from the position 173, the obtained shift direction, and the obtained shift amount.

The image processor 160 receives the position of the content image 180 included in the projection image R1 from the display position determination unit 25 and disposes the content image 180 in the projection image R1, based on the position.

In the case in which the content image 180 does not reach the target projection position 175 even if the position of the content image 180 is shifted at a maximum within the projection image R1, furthermore, the orientation of the projector device 100 is changed such that the content image 180 is projected at the target projection position 175. For this purpose, the projecting direction calculation unit 31 calculates the projecting direction of the projection image R1 projected by the projector device 100 (i.e., the orientation of the projector device 100). Specifically, the projecting direction calculation unit 31 obtains the projecting direction of the projector device 100 in which the display position (e.g., the central position) determined by the display position determination unit 25 and the target projection position (e.g., the central position) are caused to be coincident with each other, based on a difference between these positions. Thereafter, the projecting direction calculation unit 31 calculates a driving command (a driving voltage) for driving the driver 110 to turn the projector device 100 into the obtained projecting direction.

The driver 110 changes the projecting direction of the projector device 100 based on the driving command given from the projecting direction calculation unit 31. At this time, the image processor 160 performs geometric correction processing for the content image 180 corresponding to the target projection position 175.

Figure 7:
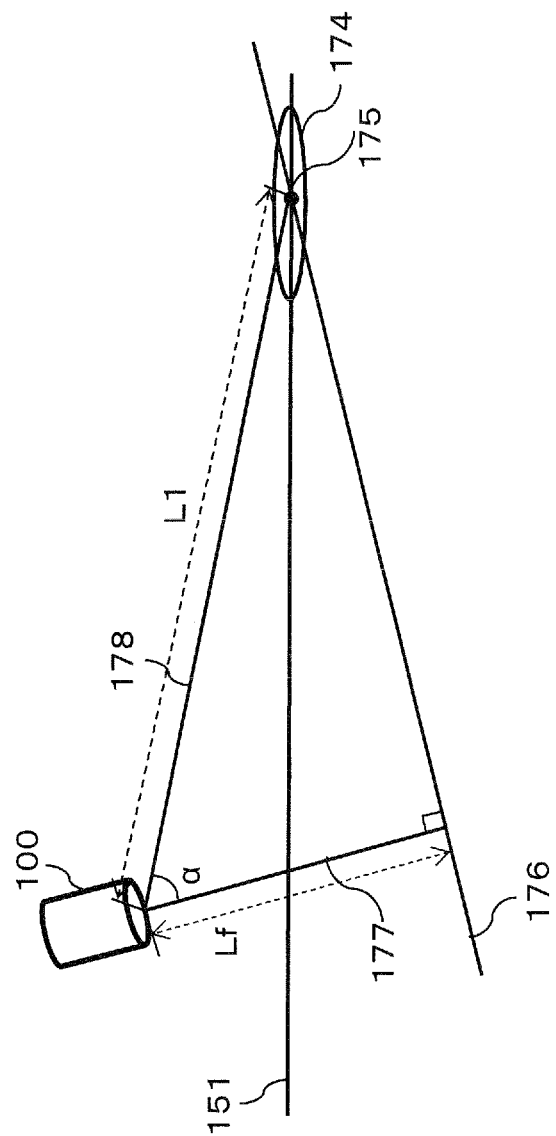
FIG. 7 is a view for explaining focus distance calculation through the controller of the projector device.

Next, it is necessary to perform focusing at the target projection position 175. For this purpose, the focus distance calculation unit 41 obtains a focus distance. FIG. 7 is a view for explaining the focus distance calculation. FIG. 7 is a view showing the projector device 100 and the projection surface 151 seen laterally. As shown in FIG. 7, the focus distance calculation unit 41 assumes a virtual projection surface 176 of the projector device 100 to obtain a distance between the virtual projection surface 176 and the projector device 100 as a focus distance Lf. The virtual projection surface 176 is a plane which sets an optical axis 177 of the projector device 100 as a normal and passes through the target projection position 175.

Specifically, the focus distance calculation unit 41 calculates a projection distance L1 between the position of the projector device 100 and the target projection position 175 (the target projection region 174). Then, the focus distance calculation unit 41 calculates the focus distance Lf based on the projection distance L1 from the projector device 100 to the target projection position 175 and an angle formed by the optical axis 177 of the projector device 100 and the direction of the content image 180 seen from the projector device 100. Herein, the target projection position 175 is placed at the most end at the projection angle of view θ. Therefore, an angle α formed by a straight line 178 connecting the position of the projector device 100 and the target projection position 175 and the optical axis 177 is obtained from a half of the projection angle of view θ and the target projection position 175 in the projection image R1. Consequently, the focus distance calculation unit 41 calculates the focus distance Lf of the projector device 100 from the projection distance L1 and the angle α.

The focus control unit 43 calculates a driving command (a driving voltage) for driving a driver for a focus lens such that the focus distance of the focus lens of the projection optical system 500 is equal to the focus distance Lf obtained by the focus distance calculation unit 41.

The projection optical system 500 drives the focus lens driver based on the driving command given from the focus control unit 43 and focuses on the displayed content image.

Figure 8B:
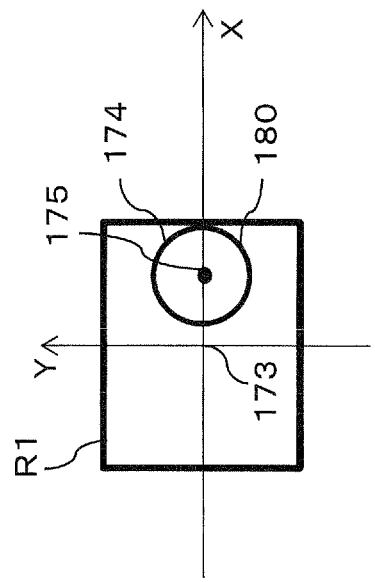
FIGS. 8A and 8B are views for explaining the control of the position of the content image included in the projection image through the controller of the projector device (in the case in which the target projection position is placed within the range of the projection image in the state in which the optical axis of the projector device is orthogonal to the projection surface).
Figure 8A:
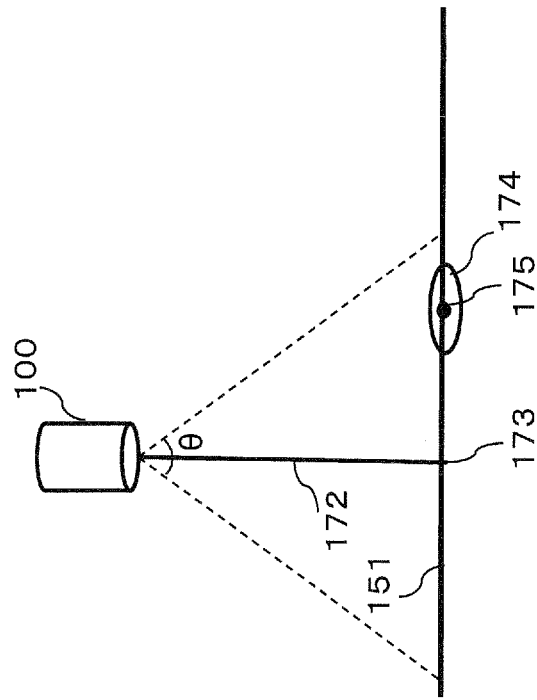

As shown in FIGS. 8A and 8B, in the case in which the target projection position 175 is within the range of the projection region R1 in a state in which the orientation of the projector device 100 is set such that the optical axis 172 of the projector device 100 is orthogonal to the projection surface 151, the orientation of the projector device 100 is prevented from being further changed. In other words, the shift amount calculation unit 23 calculates, as a shift amount, a distance from the intersection point 173 of the optical axis 172 of the projector device 100 and the projection surface 151 to the target projection position 175 (the central position of the target projection region 174). Based on the shift amount, the display position determination unit 25 determines the position of the content image 180 of the projection image R1 as the target projection position 175 (the target projection region 174). At this time, the content image 180 is displayed at the target projection position 175 in a state in which the optical axis 172 of the projector device 100 is orthogonal to the projection surface 151. For this reason, a change amount in the projecting direction of the projector device 100, which is obtained by the projecting direction calculation unit 31, is zero. Consequently, it is possible to project the content image 180 at the target projection position 175 (within the projection region 174) without changing the projecting direction of the projector device 100. Therefore, focusing can be performed in the whole projection image R1.

As described above, the projector device 100 according to the present embodiment first shifts the position of the content image 180 included in the projection image R1 such that the content image 180 is displayed in a position which is as close to the target projection position 175 as possible when an image is projected in a state in which the optical axis 172 of the projector device 100 is orthogonal to the projection surface 151 (FIGS. 6A to 6C). In the case in which the content image 180 cannot be displayed at the target projection position 175 by adjustment of the position of the content image 180 included in the projection image R1, the content image 180 is displayed at the target projection position 175 by a further change in the orientation of the projector device 100. Thus, description will be given of an advantageous effect of controlling the projection image R1 (the projection region R2 after the geometric correction) and the projection position thereof.

FIGS. 9A and 9B are views showing a focus scope on the projection surface through the projection control of the projector device 100 according to the present embodiment. On the other hand, FIGS. 10A and 10B are views showing a focus scope on the projection surface through the projection control of the projector device 100 according to a comparative example. FIGS. 9A and 10A are views showing the projector device 100 and the projection surface 151 seen laterally. FIGS. 9B and 10B are views showing the projection surface 151 seen from the projector device 100 side.

In the comparative example shown in FIGS. 10A and 10B, the position of the content image 180 included in the projection image R2 (after the geometric correction) is maintained in the central position of the projection image R2 and the projecting direction of the projector device 100 is changed to be turned toward the target projection position 175 to project the content image 180 at the target projection position 175. At this time, in the case in which the content image 180 is focused on, that is, in the case in which the optical axis 177 of the projector device 100 is set to be a normal and the virtual projection surface 176 passing through the target projection position 176 is focused, the distance between the virtual projection surface 176 and the projector device 100 is equal to the focus distance Lf and focusing is performed in a predetermined focusing depth D corresponding to the focus distance Lf. For this reason, there is performed focusing on the image projected in the range (focus scope) Rf2 corresponding to the focus depth D on the projection surface 151.

On the other hand, in the present embodiment, the position of the content image 180 included in the projection image R2 (after the geometric correction) is shifted from the central position of the projection image R2, and the projecting direction of the projector device 100 is changed by a difference between the shifted position and the target projection position 175 to project the content image 180 at the target projection position 175 as shown in FIGS. 9A and 9B. Consequently, a moving amount in the projecting direction of the projector device 100 is reduced more greatly so that the image can be projected in a closer state to the state in which the optical axis 177 is orthogonal to the projection surface 151. Therefore, it is possible to obtain a focus scope Rf1 which is enlarged more greatly as compared to Rf2 shown in FIG. 10A on the projection surface 151 corresponding to the predetermined focus depth D.

[1-3. Advantageous Effects]

As described above, in the present embodiment, the projecting device 100 includes the projector (the video generator 400 and the projection optical system 500) configured to project the projection image R2 including the content image 180 (after the geometric correction: the projection image before the geometric correction is represented by R1) onto the projection surface 151, the first detector (the distance detector 230 and the human position detector 11) configured to detect the target projection position 175 on the projection surface 151 at which the content image 180 is to be projected, the image processor 160 configured to generate the projection image R2, the driver 110 configured to change the orientations of the projectors 400 and 500 in order to change the projection position of the projection image R2, and the controller 210 configured to control the image processor 160 and the driver 110. The controller 210 controls the image processor 160 to set the position of the content image 180 in the projection image such that the difference between the display position and the target projection position 175 is minimized on the projection surface 151 of the content image 180 when the projection image is projected in the state in which the orientations of the projectors 400 and 500 are set such that the optical axis 177 of the projectors 400 and 500 is orthogonal to the projection surface 151 (i.e., in the state in which the projectors 400 and 500 are opposed to the projection surface 151). The controller 210 also controls the driver 110 to set the orientations of the projectors 400 and 500 such that the projection image R2 including the content image 180 at the set position is projected at the target projection position 175 on the projection surface 151.

According to the present embodiment, in the case in which an image is projected onto the projection surface 151, the position of the content image included in the projection image R2 on the projection surface 151 of the projector device 100 (i.e., the display position of the content image 180 at the projection angle of view θ of the projector device 100) is set to the most end of the projection image R2 (i.e., at the projection angle of view θ), that is, is set such that the difference between the display position of the content image and the target projection position 175 is minimized, and the projecting direction of the projector device 100 is changed corresponding to the difference between the display position and the target projection position. Consequently, the moving amount in the projecting direction of the projector device 100 is reduced so that an image can be projected in a closer state to the state in which the optical axis 177 is orthogonal to the projection surface 151. Therefore, it is possible to enlarge the focus scope Rf1 in which the focusing is performed on the projection surface 151 corresponding to the to the predetermined focus depth D.

Second Embodiment

In a second embodiment, focus control is performed for focusing on a predetermined position in a content image. For example, in the case in which the content image has character information, focusing on a position of the character information is preferentially performed.

A structure of a projector device according to the second embodiment is basically the same as that according to the first embodiment described with reference to FIGS. 1 to 3, and the function and operation of a controller 210 are different from those described above.

Figure 11:
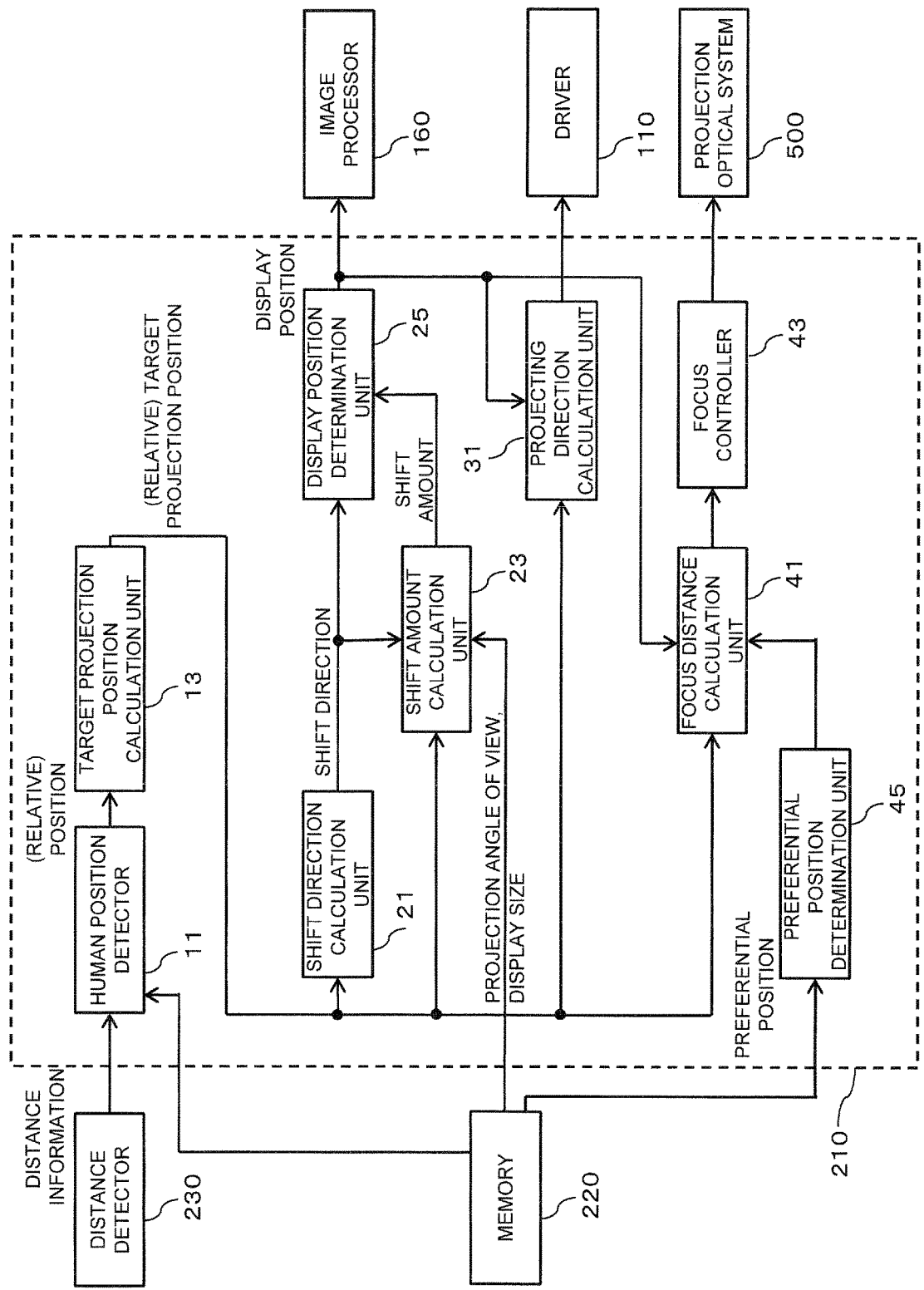
FIG. 11 is a block diagram showing a functional structure of a controller of a projector device (a second embodiment).

With reference to FIG. 11, description will be given of a specific operation of the controller 210 according to the second embodiment. FIG. 11 is a view showing a functional structure of the controller 210 according to the second embodiment. The controller 210 shown in FIG. 11 further includes a preferential position determination unit 45. Information indicative of a position at which in a content image character information is included (e.g., a relative position with a center of the content image) is previously stored in the memory 220.

The preferential position determination unit 45 acquires, from the memory 220, the information indicative of the position at which in the content image the character information is included, and determines this position as a preferential position in which focusing is preferentially performed in the content image.

The operation of the controller 210 according to the present embodiment will be described below with a position 175 set to be the preferential position in FIG. 7. As shown in FIG. 7, a focus distance calculation unit 41 sets an optical axis 177 of the projector device 100 as a normal and assumes a virtual projection surface 176 passing through the target projection position 175 to calculate a distance between the virtual projection surface 176 and the projector device 100 as a focus distance Lf. Specifically, the focus distance calculation unit 41 calculates a projection distance L1 between the position of the projector device 100 and the preferential position 175. Then, the focus distance calculation unit 41 calculates the focus distance Lf based on the projection distance L1 from the projector device 100 to the preferential position 175 and the angle formed by the optical axis 177 of the projector device 100 and the direction of the content image 180 seen from the projector device 100. Herein, an angle α formed by the straight line 178 connecting the position of the projector device 100 and the preferential position 175 and the optical axis 177 is calculated from the half of the projection angle of view θ and the preferential position 175 in the projection image R1. Consequently, the focus distance calculation unit 41 calculates the focus distance Lf of the projector device 100 from the projection distance L1 and the angle α.

By calculating the focus distance Lf as described above, thus, it is possible to perform focusing into a portion of the content image to be prioritized.

Third Embodiment

In the second embodiment, the preferential position to be preferentially focused in the content image is determined based on the position information previously stored in the memory 220. However, it is also possible to detect a position gazed in the content image by a gazer, using a well-known visual line detecting technique and to set the detected position as a preferential position to be preferentially focused in the content image.

A structure of a projector device according to a third embodiment is basically the same as that according to the first embodiment described with reference to FIGS. 1 to 3 except that a visual line detector is further provided. Moreover, the function and operation of a controller 210 are different from those described above.

Figure 12:
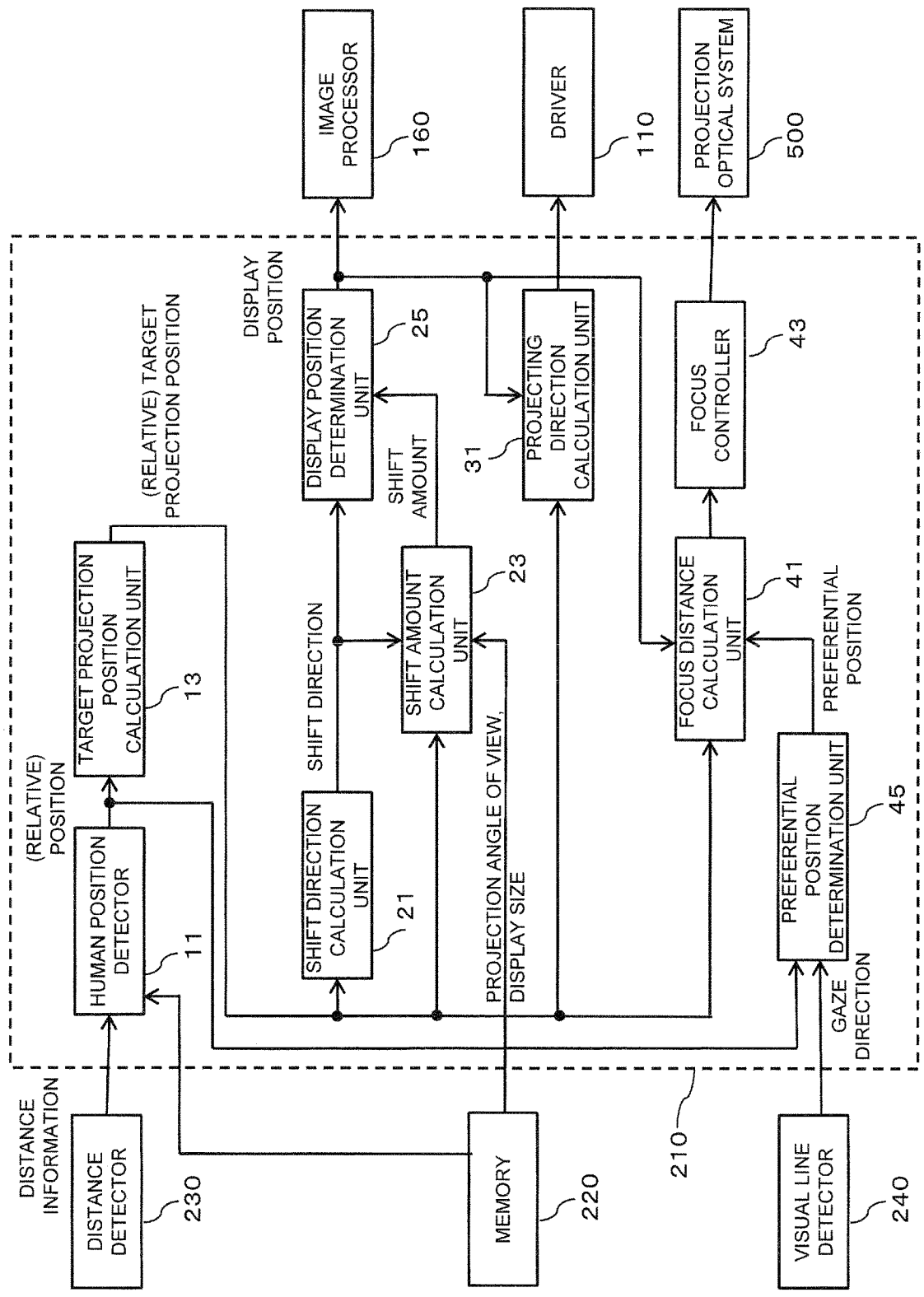
FIG. 12 is a block diagram showing a functional structure of a controller of a projector device (a third embodiment).

With reference to FIG. 12, description will be given of a structure and an operation of the controller 210 in the projector device 100 according to the third embodiment. As shown in FIG. 12, the projector device 100 further includes a visual line detector 240 and a preferential position determination unit 45 in addition to the structure according to the first embodiment. The visual line detector 240 is an imaging device such as a camera and detects a gaze direction of eyes of a person to be detected by the distance detector 230 and the human position detector 11.

The preferential position determination unit 45 obtains a gaze position in a projection surface 151, that is, a gaze position in a content image projected onto the projection surface 151, from a position of a person detected by the distance detector 230 and the human position detector 11 and the gaze direction detected by the visual line detector 240, and determines the gaze position thus obtained as a preferential position at which in the content image focusing is preferentially performed.

Consequently, it is possible to perform focusing on a portion in the content image which is being actually seen by a person offering the content image.

Fourth Embodiment

In the first embodiment, the display size of the content image 180 (e.g., the value in the X direction and the value in the Y direction of the rectangular shape) is previously stored in the memory 220 and the shift amount is calculated based on the stored display size. In the present embodiment, a binary image indicating a display portion and a non-display portion of the content image 180 by two values is stored in the memory 220, and the shift amount of the content image 180 is obtained based on a shape of the display portion of the binary image.

Although a structure of a projector device according to the fourth embodiment is basically the same as that according to the first embodiment described with reference to FIGS. 1 to 3, a function and an operation of a controller 210 are different from those described above.

With reference to FIG. 11, a specific operation of the controller 210 according to the fourth embodiment will be described. FIG. 11 is a diagram showing a functional structure of the controller 210 according to the second embodiment. Since the same diagram is also employed in the fourth embodiment, description will be omitted. The memory 220 previously stores information about a binary image indicative of the display shape of a content image 180 in place of information indicative of a display size of the content image 180.

Figure 13B:
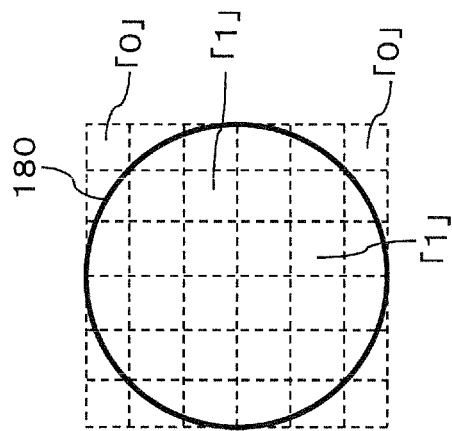
FIG. 13A is a view showing information on a display size of a content image and FIG. 13B is a view showing information on a display shape of the content image (a fourth embodiment).
Figure 13A:
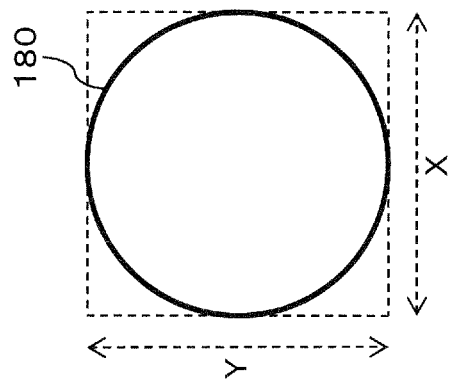

FIG. 13A is a view showing information about the display size of the content image 180. FIG. 13B is a view showing information about the display shape of the content image 180. As shown in FIG. 13A, in the first embodiment, even if the shape of the content image 180 takes a circular shape, for example, the size of the rectangular shape represented by the value "X" in the X direction and the value "Y" in the Y direction is stored as the display size of the content image 180 in the memory 220.

On the other hand, in the present embodiment, the memory 220 stores a binary image representing the display portion "1" and the non-display portion "0" by two values as the display shape of the content image 180 as shown in FIG. 13B. For example, the value "1" indicative display or the value "0" indicative of non-display is set for every pixel of the content image taking the rectangular shape. The display portion "1" in the binary image indicates the display shape of the content image 180.

A shift amount calculation unit 23 obtains the display shape of the content image 180 from the display portion "1" in the binary image, and calculates the shift amount such that the content image 180 is positioned in the most end of a projection image R2 based on the display shape.

Thus, the shift amount is computed based on a closer shape to the display shape of the content image 180. Consequently, the content image 180 can be positioned at a more end in the projection image R2 (e.g., four corner portions of the rectangular shape). Therefore, the focus scope can be enlarged more greatly.

Fifth Embodiment

In the fourth embodiment, the binary image indicating the display portion and the non-display portion by two values as the display shape of the content image 180 is stored in the memory 220 and the shift amount is obtained based on the shape of the display portion of the stored binary image. In a fifth embodiment, a display shape is detected from a content image 180 itself and a shift amount is obtained based on the detected display shape.

Although a structure of a projector device according to the fifth embodiment is basically the same as that according to the first embodiment described with reference to FIGS. 1 to 3, a function and an operation of a controller 210 are different from those described above.

Figure 14:
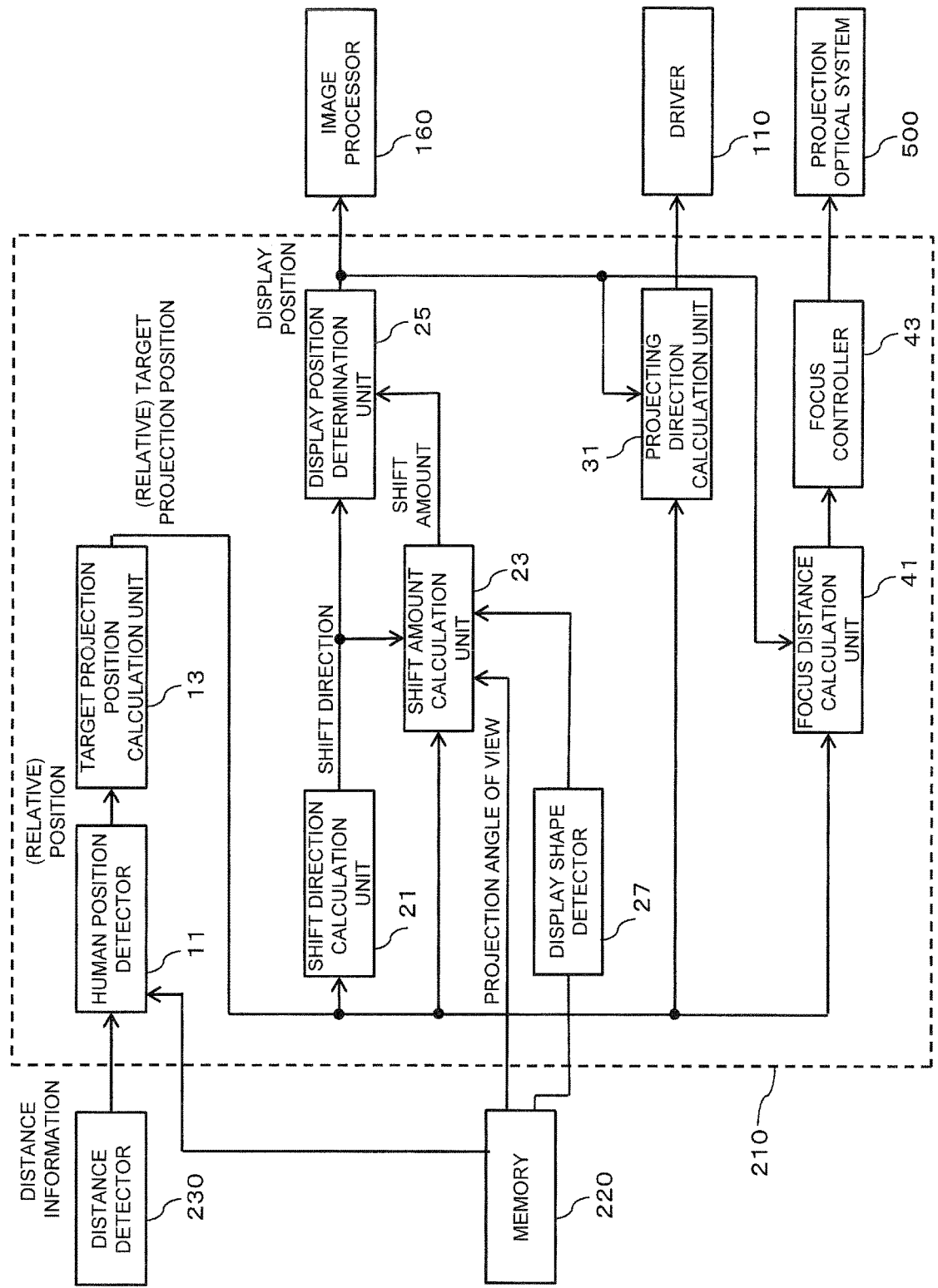
FIG. 14 is a block diagram showing a functional structure of a controller of a projector device (a fifth embodiment).

With reference to FIG. 14, a specific operation of the controller 210 according to the fifth embodiment will be described. FIG. 14 is a diagram showing a functional structure of the controller 210 according to the fifth embodiment. The controller 210 shown in FIG. 14 further includes a display shape detector 27.

The display shape detector 27 detects the content image stored in the memory 220 as a binary image indicating a display portion and a non-display portion by two values. Specifically, the display shape detector 27 detects as a binary image indicating, by two values, a pixel having a predetermined color in the content image as the non-display portion "0" and a pixel having a color other than the predetermined color in the content image as the display portion "1" based on a chroma color, for example. The shift amount calculation unit 23 obtains the display shape of the content image 180 from the display portion "1" in the detected binary image, and calculates the shift amount such that the content image 180 is positioned at the most end of the projection image R2, based on the display shape.

Also in the fifth embodiment, in the same manner as in the fourth embodiment, the shift amount is calculated based on a closer shape to the display shape of the content image 180. Consequently, the content image 180 can be positioned at a more end in the projection image R2. As a result, the focus scope can be enlarged more greatly.

Other Embodiments

The first to fifth embodiments have been described above as an example of the technique to be disclosed in the present application. The technique in the present disclosure is not restricted to the first to fifth embodiments, but can also be applied to embodiments in which change, replacement, addition, and omission are properly performed. Moreover, it is also possible to make a new embodiment by combining the respective components described in the first to fifth embodiments. Therefore, other exemplary embodiments will be described below.

(1) The projector device 100 in the present disclosure is an example of a projecting device. Each of the distance detector 230 and the human position detector 11 in the present disclosure is an example of a detector that detects a target projection position on a projection surface at which a content image is to be projected. Each of the video generator 400 and the projection optical system 500 in the present disclosure is an example of a projector.

(2) Although a person is detected as a specific object and a predetermined image (content) is displayed while following the movement of the person in the embodiments, the specific object is not restricted to a person. A moving object (e.g., an automobile or an animal) other than the person may be employed.

(3) Although the distance information is used for detecting the specific object in the embodiments, means for detecting the specific object is not restricted thereto. In place of the distance detector 230, it is also possible to use an imaging device capable of performing imaging through RGB light. It is also possible to detect the specific object from an image captured by the imaging device, and furthermore, to detect the position of the specific object.

(4) It is possible to properly combine the techniques disclosed in the first to third embodiments.

As described above, the embodiments have been described as illustrative for the technique in the present disclosure. For this purpose, the accompanying drawings and the detailed description have been provided.

Accordingly, the components described in the accompanying drawings and the detailed description may include components which are indispensable to solve the problems as well as components which are not indispensable to solve the problems in order to illustrate the technique. For this reason, the non-indispensable components should not be approved to be indispensable immediately based on the description of the non-indispensable components in the accompanying drawings or the detailed description.

Moreover, the embodiments serve to illustrate the technique in the present disclosure. Therefore, various changes, replacements, additions, omissions, and the like can be made within the claims or equivalents thereof.

INDUSTRIAL APPLICABILITY

The projecting device according to the present disclosure can be applied various uses for projecting a video onto a projection surface.

What is claimed is:

1. A projecting device for projecting a projection image including a content image onto a projection surface, the projecting device comprising:
   a projector configured to project the projection image onto the projection surface within a projection angle of view of the projector, the projection angle of view defining a maximum projection region for projecting of the projection image;
   a first detector configured to detect a person;
   an image processor configured to generate the content image;
   a driver configured to change an orientation of the projector in order to change a direction of the projection angle of view; and
   a controller configured to:
      calculate a position of the detected person, a target position relative to the detected person, a shift direction of the content image, a shift amount of the content image, and a display position to be projected on the projection surface, wherein the target position is a position where the content image is visible to the person depending on movement of the detected person,
      control the image processor, the driver, and at least a part of the first detector,
      determine, using the calculated position of the detected person, the target position for the content image, and determining whether the target position is within a range of the maximum region, and determining whether the target position is outside of the range of the maximum projection region,
      control the image processor to project the content image to the target position, and change the position of the content image within the projection image according to the shift direction and the shift amount without changing the orientation of the projector in response to the controller determining that the target position is within a range of the maximum region, and
      calculate a projection direction, control the image processor to change the position of the content image to a shifted position at a most end of the projection image in the shift direction, and control the driver to change the direction of the projection angle of view by an amount of a difference between the shifted position and the target position in response to the controller determining that the target position is outside of the range of the maximum region;
   wherein the target position being determined by the controller to be outside of the range of the maximum projection region results in the controller controlling the image processor to cause a display position of the content image within the projection angle of view to approach the target position as the projector projects in a state in which the optical axis is orthogonal to the projection surface, the display position of the content image being variable within the projection angle of view.

2. The projecting device according to claim 1, wherein the controller is configured to calculate:
   the shift direction by calculating a direction from an intersection point of an optical axis of the projector with the projection surface to the target position in a state in which the orientation of the projector is set such that the optical axis of the projector is orthogonal to the projection surface;
   the shift amount of the content image within the projection angle of view using the shift direction and the projection angle of view; and
   the display position of the content image within the projection angle of view using the shift direction and the shift amount.

3. The projecting device according to claim 2, further comprising:
   a storage configured to store a display size of the content image,
   wherein the controller calculates the shift amount using the display size.

4. The projecting device according to claim 2, further comprising:
   a storage configured to store the content image as a binary image indicating a display portion and a non-display portion by two values,
   wherein the controller calculates the shift amount using a shape of the display portion of the binary image.

5. The projecting device according to claim 2, further comprising:
   a second detector configured to detect the content image as a binary image indicating a display portion and a non-display portion by two values,
   wherein the controller calculates the shift amount using a shape of the display portion of the binary image.

6. The projecting device according to claim 5, wherein the second detector detects, as the non-display portion, a pixel having a predetermined color in the content image and detects, as the display portion, a pixel having a color other than the predetermined color in the content image.

7. The projecting device according to claim 1, wherein the controller is configured to calculate the orientation of the projector using a difference between the target position and the display position.

8. The projecting device according to claim 1, wherein the controller is configured to:
   calculate a focus distance using a projection distance from the projector to the target position and an angle formed by the optical axis of the projector and a direction of the content image seen from the projector; and
   control a focus of the projector using the focus distance.

9. The projecting device according to claim 1, wherein the controller is configured to:
   calculate a focus distance using a projection distance from the projector to the target position, the projection angle of view, and the target position; and
   control a focus of the projector using the focus distance.

10. The projecting device according to claim 8, wherein the controller is configured to:

determine an in-focus state position of the content image, and calculate a focus distance using a projection distance from the projector to the in-focus state position and the angle formed by the optical axis of the projector and the direction of the content image seen from the projector.

11. The projecting device according to claim 9, wherein the controller is configured to:

determine an in-focus state position of the content image, and calculate a focus distance based on a projection distance from the projector to the in-focus state position, the projection angle of view, and the in-focus state position.

12. The projecting device according to claim 10, further comprising:

a storage configured to previously store a focus position, wherein the controller is configured to determine the focus position stored in the storage as the in-focus state position.

13. The projecting device according to claim 10, further comprising:

a third detector configured to detect a position gazed in the content image by a gazer, the object being the gazer, wherein the controller is configured to determine a position detected by the third detector as the in-focus state position.

14. The projecting device according to claim 1, wherein the object is a user, and the display position of the content image is set by the controller in the projection angle of view in order to make the display position of the content image on the projection surface be projected, on the projection surface, at a position that is ahead of the user by a predetermined distance.

15. The projection device according to claim 1, wherein the projector projects the content image at the target position in a state in which the optical axis of the projector decenters on the target position.

16. The projection device according to claim 1, wherein the projector projects the content image at the target position in a state in which the optical axis of the projector is directed to a position between the target position and a position where the optical axis of the projector is orthogonal to the projection surface as the projector projects in the state in which the optical axis of the projector is orthogonal to the projection surface.

* * * * *